United States Patent [19]

L'Esperance et al.

[11] Patent Number: 4,770,162

[45] Date of Patent: Sep. 13, 1988

[54] SOLAR ENERGY COLLECTING SYSTEM

[75] Inventors: Paul M. L'Esperance; Ronnie D. Nikkel, both of Bartlesville, Okla.

[73] Assignee: Phillips Petroleum Company, Bartlesville, Okla.

[21] Appl. No.: 498,601

[22] Filed: May 26, 1983

[51] Int. Cl.⁴ .................................................. F24J 3/02
[52] U.S. Cl. ..................................... 126/438; 350/608; 350/614
[58] Field of Search ..................... 350/292, 295, 582; 126/438, 439

[56] References Cited

U.S. PATENT DOCUMENTS

| | | | |
|---|---|---|---|
| 3,923,381 | 12/1975 | Winston | 350/294 |
| 4,038,971 | 8/1977 | Bezborodko | 350/292 |
| 4,071,017 | 1/1978 | Russell, Jr. et al. | 126/438 X |
| 4,106,480 | 8/1978 | Lyon et al. | 126/438 |
| 4,119,365 | 10/1978 | Powell | 350/295 |
| 4,134,387 | 1/1979 | Tornstrom | 126/438 |
| 4,148,564 | 4/1979 | Devin et al. | 300/292 |
| 4,249,514 | 2/1981 | Jones | 126/438 |
| 4,262,660 | 4/1981 | Ilich | 126/451 |
| 4,276,873 | 7/1981 | Uroshenich | 126/438 |
| 4,291,677 | 9/1981 | Monk | 126/438 |

FOREIGN PATENT DOCUMENTS

| | | | |
|---|---|---|---|
| 2212528 | 3/1973 | Fed. Rep. of Germany | 350/608 |
| 0029748 | 3/1977 | Japan | 350/608 |
| 0057886 | 5/1979 | Japan | 126/439 |

Primary Examiner—Margaret A. Focarino
Attorney, Agent, or Firm—Williams, Phillips & Umphlett

[57] ABSTRACT

In accordance with the present invention, an improved receiving surface, preferably a reflector surface and preferably of the parabolic trough type, for a radiant solar energy collector system comprises an essentially open frame means defining the perimeter of an extended receiving surface and a plurality of elongated, flexible strips mounted on said frame means in parallel relation to one another, each of the strips having a width substantially less than one dimension of the frame means, whereby a plurality of the strips cover essentially the entire open area of the frame to form an essentially continuous receiving surface.

20 Claims, 4 Drawing Sheets

SOLAR ENERGY COLLECTING SYSTEM

The present invention relates to solar energy collecting systems and particularly to solar collecting energy systems including an extended reflector surface operatively associated with a collector means. Still more particularly, the present invention relates to solar energy collecting systems of the non-tracking focused type.

BACKGROUND OF THE INVENTION

Solar energy collecting systems broadly include a concentrating, focusing or reflecting means of some type which receives the sun's rays from a predetermined extended area and directs the received solar energy to a collector means of some type which in turn receives the initial energy in an enhanced or concentrated form, specifically at a much higher degree of heat per unit area than originally received by the receiving means. The collector means utilizes the energy which it receives to heat a fluid such as air or water directly for immediate use or stores the same in a heat sump or heat reservoir for ultimate use on demand. The heat energy received by the collector may also be converted to electrical energy for immediate use or converted to electrical energy and stored in storage devices or batteries for ultimate use on demand.

In most instances, the means for receiving the solar energy from the sun is some form of extended receiving surface which focuses the received energy onto a substantially smaller collector means, thus enhancing or concentrating the energy as originally received. Obviously, the receiving means, whether adapted to absorb solar energy directly or reflect it to a collector means must present an extremely large receiving surface in order to provide concentrated or enhanced energy sufficiently hot to be practical for end use.

Most solar energy systems, in use or proposed for use, have been of the type in which an extended reflecting surface receives the solar energy and directs it to a substantially smaller collector means. Such reflecting surfaces may also take a wide variety of forms. For example, flat, dished, parabolic troughs, etc. The system may also be of the tracking or nontracking type, which to a great extent, depends upon the receiving surface. For example, flat receiving surfaces or reflecting surfaces need to be oriented according to the position of the sun in order to receive sufficient energy. Thus, such systems are so-called tracking systems when the receiving surface tracks the movement of the sun from horizon to horizon on a daily basis and, preferably, the azimuthal position of the sun on a seasonal basis. While tracking on a seasonal basis can be performed manually, it is wholly impractical to manually track the sun on a daily basis. Accordingly, automatic tracking systems are provided. Such tracking systems are complex and expensive to operate and maintain. By contrast, a parabolic trough-type receiving means can be utilized as a so-called nontracking systems. By appropriately shaping the parabola and sizing and positioning a collector within the parabola so as to receive substantially all of the energy received by and reflected by the inner reflecting surface of the parabola and correctly positioning the reflector surface in a generally east-west direction, it is unnecessary to track on a daily basis and all that is required for maximum efficiency is changing the orientation several times, for example, two to four times per year, to accommodate seasonal changes of the positions of the sun. Because of the size of the receiving surface necessary, it is obvious that a major portion of the cost of such a system lies in the manufacture, transportation and installation of the receiving surface, particularly where the receiving surface is a reflective surface.

Another cost factor, which generally has not been recognized in the art until after commercial units have been installed, is the rapid deterioration of the receiving surface due to exposure to the elements. Even if the receiving surface is such that it does not permanently deteriorate as a result of exposure to the elements, for example, glass mirrors, collection of dirt and the like on the surface also causes rapid temporary deterioration of the surface and a substantial reduction in efficiency. One solution to this problem has been the provision of automatic cleaner or washing systems. This, of course, adds to the cost of the overall system and there is a limit as to how many times any surface can be cleaned without damaging the surface. Another solution to this problem has been the provision of readily replaceable rigid or semirigid panels. One of the less expensive types of panels that has been proposed has been an extruded rigid or semirigid substrate sheet having a reflective thin film, such as an aluminized polyester film, bonded thereto and, preferably, also having a transparent protective film or coating over the top of the aluminized film. Problems peculiar to this type of structure include finding the right combination of materials which can be bonded together and to which anchoring means can be appropriately attached. It has been found that at least local delamination occurs, believed to be primarily due to moisture collecting between the layers. In any type of rigid or semirigid panel construction, as was previously described, the very size of the panels results in substantial cost of the manufacture, transportation, installation and replacement. The size also creates problems in installation due to the action of the wind on the panels. A still further reduction in costs can be attained by the utilization of flexible, sheet-type reflectors such as an aluminized flexible sheet of polyester. Obviously, initial costs, transportation costs and replacement costs are substantially reduced by this type of receiving surface.

However, the flexible sheet-type surfaces have their own inherent problems. Most of these problems are attributable to the action of the wind during installation and use. Obviously, the sheet must be thick enough to withstand wind forces expected to be encountered in the area where the system is to be located, snow accumulation, rain, hail, etc., without distorting or rupturing the flexible sheet. In general, however, it is believed that flexible polyester sheets of at least about 5 mil thickness can withstand the force of these elements without serious distortion or destruction. For example, such materials are capable of continued operation at wind speeds as high as ten miles per hour. While such material will generally withstand wind speeds above this level, it has been found that the material tends to flutter at these higher wind speeds, thus substantially reducing the receiving efficiency. Finally, in addition to size contributing to problems of installation, the flexible nature of the material further exaggerates the problem.

SUMMARY OF THE INVENTION

Figure 1:
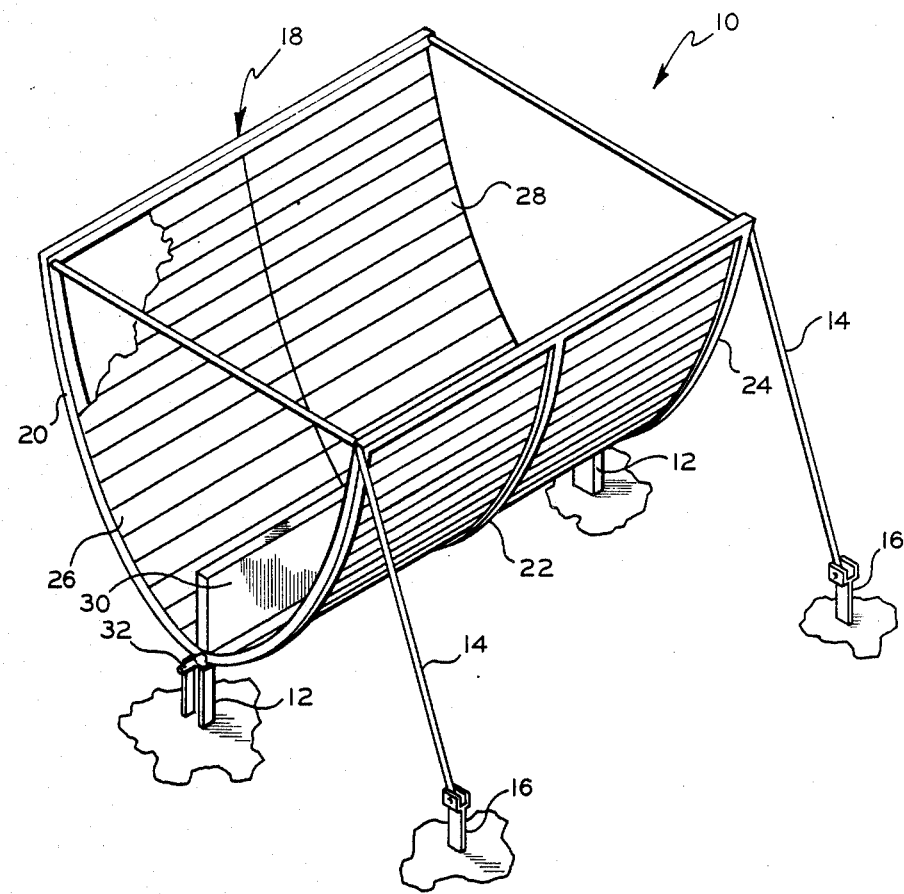
FIG. 1 is a perspective view of a solar energy collector system in accordance with one embodiment of the invention.

It is therefore an object of the present invention to provide an improved radiant solar energy collector system which overcomes the above-mentioned and other problems of the prior art. Another object of the present invention is to provide an improved receiver surface for a radiant solar energy collector system which overcomes the above-mentioned and other problems of the prior art. Yet another object of the present invention is to provide an improved reflector surface for a radiant solar energy collector system which overcomes the above-mentioned and other problems of the prior art. Another and further object of the present invention is to provide an improved radiant solar energy collector system which is relatively inexpensive to manufacture, transport and install. A further object of the present invention is to provide an improved reflector surface for a radiant solar energy collector system which is relatively easy to install. Another and further object of the present invention is to provide an improved reflector surface for a radiant solar energy collector system wherein a damaged and/or deteriorated reflector surface can be readily replaced. Yet another object of the present invention is to provide an improved reflector surface for a radiant solar energy collector system capable of withstanding abnormal environmental conditions. A still further object of the present invention is to provide an improved reflector surface for a radiant solar energy collector system capable of withstanding abnormal wind conditions. Another object of the present invention is to provide an improved reflector surface for a radiant solar energy collector system capable of withstanding abnormal wind conditions without distortion and/or destruction thereof. A further object of the present invention is to provide an improved flexible reflector surface for a radiant solar energy collector system capable of withstanding abnormal wind conditions without loss of efficiency due to flutter. Another and further object of the present invention is to provide an improved flexible reflector surface for a radiant solar energy collector system wherein tension is applied to the surface and is essentially self-adjusting. Still another object of the present invention is to provide an improved reflector surface of the parabolic trough-type which accomplishes all of the above objects and has all of the mentioned advantages.

In accordance with the present invention, an improved reflector surface, preferably of the parabolic trough-type, for a radiant solar energy collector system comprises an essentially open frame means defining the perimeter of an extended reflector surface and a plurality of elongated, flexible strips mounted on said frame means in parallel relation to one another, each of the strips having a width substantially less than one dimension of the frame means, whereby a plurality of the strips cover essentially the entire open area of the frame to form an essentially continuous reflector surface. In a preferred embodiment of the invention, the length of the strips of flexible material is greater than the length of the reflector surface spanned by the strips, the strips are adapted to be at least intervally moved across the reflector surface in a manner to expose at least a part of the strips which were previously unexposed, preferably by mounting the strips on a supply roll at one end of the reflective surface and a take-up roll at the other end of the reflective surface. In another embodiment of the present invention, biasing means are maintained in contact with the flexible strips to normally maintain the strips under tension but permit the strips to move a limited distance against the biasing force of the biasing means when a force, such as an abnormal wind force, is applied against the surface of the strip. In a still further embodiment of the present invention, the flexible strips of reflective material are normally of insufficient strength to withstand abnormal pressure applied thereto, as by abnormal wind conditions, and a flexible support strip, separate from the reflective strip is mounted beneath the reflective strip and having a strength normally sufficient to withstand such abnormal pressure conditions, is mounted beneath the reflective strip. In the last instance, the reflective strip is mounted in a manner so that the surface may be renewed, as for example, on supply and take-up rolls and a support strip is fixedly mounted and both the reflective strip and the support strip are held taut by a biasing means which also permits flexure of the strips due to abnormal pressures.

DETAILED DESCRIPTION OF THE PREFERRED EMBODIMENTS

While the present invention is applicable to absorber as well as reflector surfaces of a radiant solar energy collector system, in accordance with the present invention, it is preferably utilized as a reflector surface. In addition, although the present invention is generally applicable to receiving surfaces of any known shape, it is preferably utilized in nontracking systems having parabolic trough-type receiving surfaces.

The nature and advantages of the present invention will be better understood by the following description when read in conjunction with the drawings.

FIG. 1 of the drawings illustrates a preferred solar energy collector system in accordance with the present invention, which comprises a parabolic trough-type reflecting surface which can be fixedly installed in a generally east-west direction to provide a nontracking system. As previously indicated, better year around efficiency can be attained by adjusting the reflector surface several times per year, for example, two to four times per year, to compensate for changes in the position of the sun due to seasonal changes. The general design, structure, installation and operation of this type of system is disclosed in greater detail in U.S. Pat. Nos. 4,024,852 and 4,263,892, which are incorporated herein by reference, and other such details are known to those skilled in the art.

In accordance with FIG. 1, a parabolic trough-shaped extended reflector surface 10 is mounted on legs 12, which are, of course, anchored, as in concrete. Further anchoring is provided by struts or guy wires 14, which are in turn attached to anchors 16, also mounted in concrete or other foundation material. Reflector surface 10 is made up of an open frame member 18, which defines the perimeter of the reflective surface and includes a plurality of curved supports 20, 22, and 24 of semi-parabolic curvature. It should be pointed out at this time that, in the description and claims which follow, the reflector surface between supports 20 and 22 or 22 and 24 are referred to as a single reflector surface and the total structure from support 20 to support 24 is referred to as a plurality of reflector surfaces connected in end-to-end relationship. Mounted between supports 20 and 22 of frame means 18 are a plurality of elongated, flexible strips of reflective material. Strips 26 are mounted in parallel relationship to one another and lengthwise with respect to the parabolic trough, so as to form an essentially continuous reflector surface. The parallel relationship of strips 26 may be abutting or overlapping, as necessary or desired. A like plurality of reflector strips 28 are mounted between supports 22 and 24. Mounted along the bottom center of parabolic trough 10 is a collector means 30. A suitable collector means 30 is also described in detail in the previously mentioned U.S. Pat. Nos. 4,024,852 and 4,263,893. Reflecting surface 10 is preferably mounted on support legs 12 through end rods 32, which permit rotation of the system to compensate for seasonal variations in the location of the sun.

Figure 2:
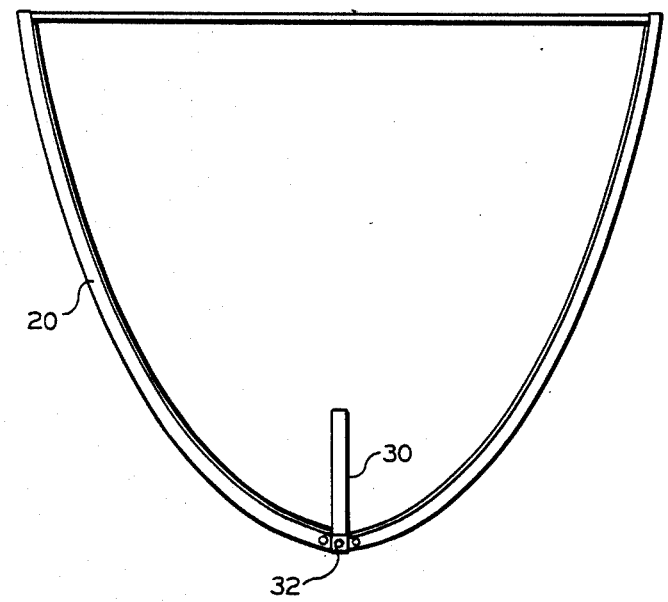
FIG. 2 is an end view of the system of FIG. 1.

FIG. 2 is an elevational end view of the system of FIG. 1.

Strips 26 and 28 may be detachably mounted on supports 20 and 22 and 20 and 24, respectively, by means of appropriate mating gripping strips of pressure-sensitive adhesive, cooperatively engaging strips of mushroom-like knobs, and hairlike projections and the like. Such detachable mounting not only permits the strips to be stretched taut but also permits ready replacement of the strips, as well as restretching, in the event the strips sag as a result of unusual wind loads or the like.

Figure 3:
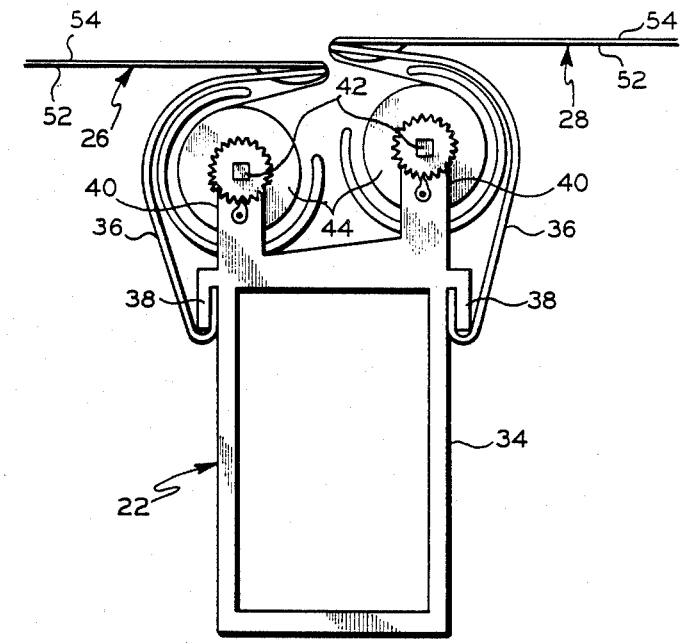
FIG. 3 is an end view of a support and receiver strip mounting means in accordance with another embodiment of the invention.
Figure 4:
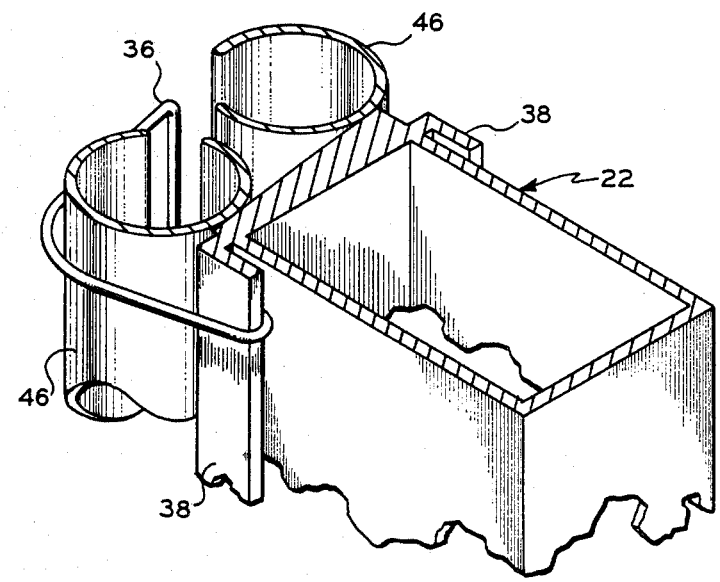
FIG. 4 is a perspective view, partially in section of the support of FIG. 3.

A preferred method of mounting strips 26 and 28 is shown in FIGS. 3 and 4 of the drawings. FIG. 3 is an end view and FIG. 4 is a prospective view, showing, for example the detailed structure of support 22. In accordance with FIGS. 3 and 4, support 22 includes a box beam 34, extruded from aluminum, pultruded from plastic or otherwise formed. During production of box beam 34, it is bent to a controlled curve generally conforming to the parabolic shape of reflector surface 10 of FIG. 1. In accordance with one embodiment of the present invention, a biasing means, such as generally U-shaped spring wire 36, is mounted by hooking the same under side flanges 38, formed in the box beam 34. If strips 26 and 28 are of the length just sufficient to span a reflective surface, the strips 26 and 28 (FIG. 1) can be removably attached to springs 36. The biasing action of the springs 36 will thus maintain strips 26 and 28 under tension under normal conditions, but, to the extent that abnormal forces, such as high winds, exert pressure against the surface of the strips, the strips will overcome the biasing action of the springs and sag slightly. However, once the abnormal conditions are relieved, the springs will return the strips to a straight taut position.

In a further preferred embodiment of the present invention, as illustrated in FIG. 3, upstanding supports 40 extend upwardly from box beam 34. Mounted in supports 40 are flexible rods 42, which are adapted to conform to the curvature of the reflective surface 10 of FIG. 1. Rods 42 support a plurality of end-to-end mounted rollers 44. Rollers 44 are adapted to be rotated by means of rods 42, whereby one of the rollers 44 will act as a supply roller for strip material, whereas the other will act as a take-up roller for strip material. By this means it is possible to easily supply a fresh reflective surface of strip material, as necessary or insert a fresh supply roll simply by sliding out rod 42, inserting fresh rolls from the end and reinserting it through rolls of fresh reflective material. The amount of the tension on the strips 26 and 28 can also be adjusted by rotating the rolls by means of rods 42 and the rods can be held in a fixed position by an appropriate holding means, such as a ratchet means. In this embodiment, the strips 26 and 28 being withdrawn from and taken up on the rolls 44 simply pass from the rolls over the essentially straight portion of the springs 36. In order to protect the rolls of strip material, they are preferably surrounded by cylindrical channels 46 fixedly attached to the box beam 34. An alternative means of removing or inserting rolls 44, carrying strip material, would be to size the slot in circular channels 46 so that the rolls would press fit through the slot in the channel.

Figure 5:
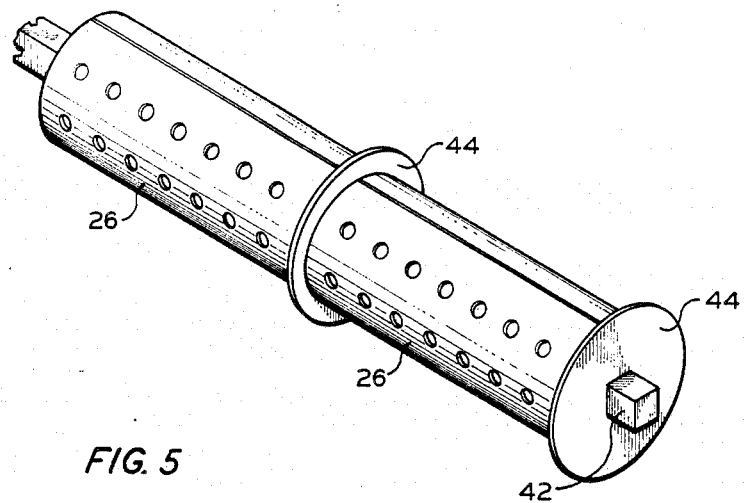
FIG. 5 is a perspective view of the strip roll-up means of FIG. 3.
Figure 6:
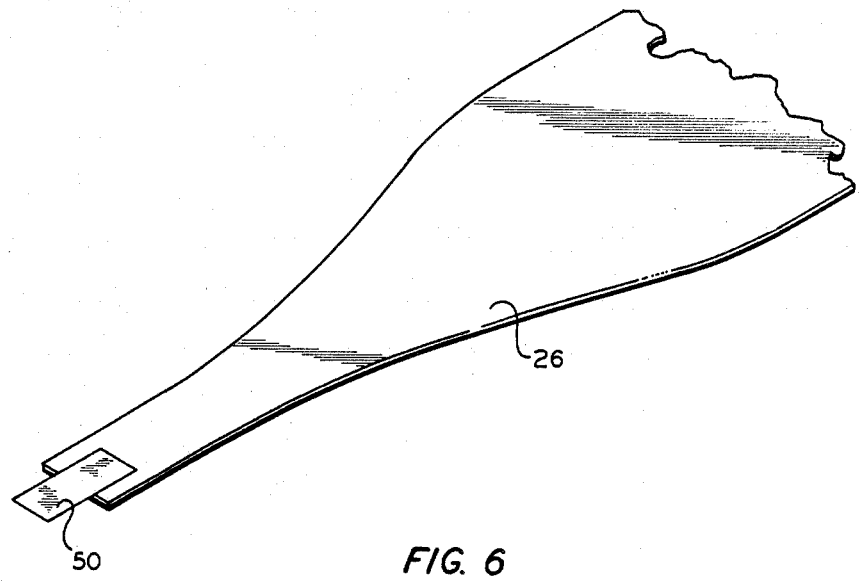
FIG. 6 is a perspective view, partially in section, of a starter strip.

FIG. 5 is a perspective view showing the mounting of a plurality of rollers 44 on rod 42. An individual roller 44 should be utilized to support each of the strips of reflective material so that the curvature of the support 22 of FIG. 3 will be followed by the rolls. FIG. 5 also shows a starter portion of reflective strip material 26 mounted on the rollers 44. Even though strips 26 are narrow strips, difficulties are encountered in attempting to initially install the strips due to wind conditions. Accordingly, the first length of the strip material may be perforated to facilitate initial mounting. FIG. 6 also illustrates a means for initially mounting the strips. In accordance with FIG. 6, the starter portion of the roll of reflective strip 26 is narrow to permit wind to pass between the strips. Affixed to the free end of starter strip 26 is self-adhesive tab 50. A leader strip (not shown) may be fixedly attached to the take-up roller in order to facilitate mounting. Accordingly, in initially mounting a fresh roll of reflective material, the reflective material is drawn from a supply roll across the frame to the take up roller on the opposite side of the frame and the starter strip 26 is adhered to the leader strip on the take-up roll.

Returning again to FIG. 3, a still further embodiment of the present invention is illustrated. Specifically, in accordance with this embodiment, instead of utilizing a reflective material of sufficient strength to withstand abnormal conditions of wind and the like substantial savings can be effected by utilizing a support strip 52 and a reflective strip 54 in combination. Support strip 52 may be made of a relatively cheap material, the only requirement being that it have sufficient strength to withstand abnormal conditions of pressure, such as wind conditions. Support strip 52 can be essentially the same length as the distance between the supports and thus fixedly or removably attached to springs 36, since it will normally not be necessary to replace this surface, except in extreme cases where it has become damaged. For example, a strip of plastic material of about 5 mils thick can adequately serve this purpose. Mounted on the rollers 44 is a much thinner strip of reflective material, for example 1 mil thick. While a strip material of this character would have insufficient strength to withstand significant pressure, any abnormal pressure applied thereto will be transmitted to the support strip 52. In any event, strips 52 and 54 are not connected to one another along their length. This eliminates the problems which have been encountered in attempting to laminate a thin sheet of reflective material to a stronger back-up material.

By way of illustrative example, the box beam forming the rib members 20, 22 and 24 (FIG. 1) of the frame, as well as the cross supports may be extruded from aluminum or pultruded from a suitable plastic. The rib members would also be formed into a predetermined parabolic curve during production.

The spools or rollers on which the strips of reflective material are stored and rolled up can likewise be made of a suitable plastic such as polyethylene. The rod passing through the spools and adapted to turn the spools, as desired, can, for example, be a quarter-inch square steel rod. This size rod has sufficient strength to hold and turn, for example, twenty three spools, while at the same time being able to bend to form the appropriate parabolic curve.

The reflective strips are preferably a polyethylene film approximately 5 mils thick, having a strength in the range of about 20,000 to about 40,000 psi. The strips may be about four inches in width and have anywhere from three to ten lengths on a single spool, thereby permitting the renewal of the reflective surface from three to ten times before changing spools. The film can be metalized on both sides if desired.

Where the combination of a support strip and a separately mounted and separate reflective strip is utilized, essentially all of the force bearing strength for both strips would be possessed by the support strip, which of course, could be of substantially reduced cost. Under these circumstances, the reflective strip can be substantially weaker and therefore thinner. For example, a metalized polyester strip about 1 mil thick would be adequate. The reflective strips may be mounted in abutting relationship, slight over lapping or with small spaces therebetween. In the last case, small gaps would reduce the wind force on the strips, therefore further reducing the strength requirements and thus the thickness of the reflective strips and/or the support strips, if this embodiment is utilized. The support strips may be the same width or multiples of the width of the reflective strips where this embodiment is utilized and rather than being a single length strip, removably attached, a second set of rollers or spools could support a multilength strip of support material in the same manner as the reflective material is stored and supported.

The biasing springs are of spring steel and are of sufficient strength to hold the reflective strips taught under wind conditions up to about twenty miles per hour without the biasing force of the springs being overcome. Should wind speeds over about 30 miles per hour occur, the biasing force of the springs will be overcome permitting the reflective strip and/or the support strip to sag slightly. For example, since there are two springs, an approximately one quarter inch movement of each spring permits about two and one-half inches of sag in the film strip. A sag in the film strips results in gaps between many of the strips, thereby reducing the pressure on the strips. This reaction reduces the net affected area which the wind can act upon, and thus also allows reduction in the basic strength of the strips. The stronger the wind, the greater the gaps between the strips. Further, the strips have a tendency to bend, cant or twist slightly under high wind conditions, thereby also relieving the pressure on the strips.

In an actual test of the value of the strip structure, strips of the above character, that is to say about four inches wide, were detachably mounted across a parabolic reflective surface approximately eight feet long along the curve of the parabola and about eighteen inches wide along the length of the trough section. The strips themselves were made of acrylanitrile-butadiene-styrene substrate of a thickness of about 0.062 to 0.083 inch thickness, having laminated thereto a reflective surface of metalized polyester. The optical performance of this reflective surface was tested and found to be substantially the same as that of a continuous sheet of such material at wind speeds up to about ten miles per hour perpendicular to the trough. Above ten miles per hour, the optical performance of the film strips began to decrease since the strips began to flutter, resulting in some decrease due to light missing the receiver strips. At twenty miles per hour, optical performance had decreased about 10% compared with solid panels. These strips were, however, maintained on location for eight and one-half months with no apparent problems and, in one test, were subjected to the exhaust gases from a jet aircraft, equivalent to a wind at a speed at about 80 miles per hour. The film strips withstood temporary conditions of this character without any apparent distortion or damage. To the extent that the embodiment utilizing the renewable surface mounted on rolls is utilized, the surface can, of course, be renewed when the optical performance decreases due to dirt, etc. or distortion or damage due to high winds or the like. Also, it should be recognized that the previously mentioned flutter of the strips under high wind conditions will be substantially overcome by the resilient or biased mounting of the strips, as opposed to the essentially fixed mounting which was tested.

While specific material, items of equipment, construction of equipment and modes of operation have been set forth above, it is to be understood that these specific recitals are by way of illustration and to set forth the best mode in accordance with the present invention only, and are not to be considered limiting and that substitutes, equivalents, variations and modifications thereof will be apparent to one skilled in the art without departing from the present invention.

That which is claimed:

1. In a radiant solar energy collector system having a parabolic, trough-type receiving surface and a collector member operably associated therewith, the improved receiving surface, comprising:
   (a) an open frame member comprising generally straight side members and curved end members defining the perimeter of said receiving surface, said end members being spaced a substantial distance apart to result in a support-free, open space of substantial length between said end members; and
   (b) a plurality of elongated, flexible strips of reflective material mounted in parallel relationship to one another and longitudinally between said end members, to thereby span said open space between said end members;
   (c) each of said flexible strips having a width substantially less than the length of the curve between said side members of said frame member, whereby said plurality of said flexible strips in parallel relationship cover essentially the entire length of said curve between said side members to form an essentially continuous receiving surface.

2. A solar energy collector system in accordance with claim 1 which additionally includes biasing means in contact with at least one end of each of said flexible strips, adapted to permit said strip to move a limited distance against the biasing force of said biasing means when a force is applied to the surface of said strips and to return to essentially their original position when said force is released.

3. A solar energy collector system in accordance with claim 1 which additionally includes at least one flexible support strip means separate from and mounted separately from the flexible strips of reflective material, mounted beneath said flexible strips of reflective material and having a strength normally sufficient to withstand significant pressure, whereby the flexible strips of reflective material are supported thereby.

4. A solar energy collector system in accordance with claim 1 wherein a length of the leading end of each of the flexible strips, essentially equal to the length of the open space between the end members, is formed to permit air to pass through or past said leading end during the initial installation of said flexible strips across said open space between said end members.

5. A solar energy collector system in accordance with claim 1 wherein a plurality of the receiving surfaces are arranged in end to end relationship to form an extended receiving surface of said solar energy collector system.

6. A solar energy collector system in accordance with claim 5 which additionally includes biasing means in contact with at least one end of each of said flexible strips, adapted to permit said flexible strips to move a limited distance against the biasing force of said biasing means when a force is applied to the surface of said flexible strips and to return to essentially their original position when said force is released.

7. A solar energy collector system in accordance with claim 5 which additionally includes at least one flexible support strip means separate from and mounted separately from the flexible strips of reflective material, mounted beneath said flexible strips of reflective material and having a strength normally sufficient to withstand significant pressure, whereby said flexible strips of reflective material are supported thereby.

8. A solar energy collector system in accordance with claim 5 wherein a length of the leading end of each of the flexible strips, essentially equal to the length of the open space between the end members, is formed to permit air to pass through or past said leading end during the initial installation of said flexible strips across said open space between said end members.

9. A solar energy collector system in accordance with claim 1 wherein the length of the flexible strips is substantially greater than the length of the open space between the end members spanned by said flexible strips and said flexible strips are adapted to be at least intervally moved across said open space in a manner to expose, as at least part of the receiving surface, at least a portion of said flexible strips which was previously unexposed.

10. A solar energy collector system in accordance with claim 9 which additionally includes biasing means in contact with at least one end of each of the flexible strips, adapted to permit said flexible strips to move a limited distance against the biasing force of said biasing means when a force is applied to the surface of said flexible strips and to return to essentially their original position when said force is released.

11. A solar energy collector system in accordance with claim 1 which additionally includes at least one flexible support strip means separate from and mounted separately from the flexible strips of reflective material, mounted beneath said flexible strips of reflective material and having a strength normally sufficient to withstand significant pressure, whereby said flexible strips of reflective material are supported thereby.

12. A solar energy collector system in accordance with claim 9 wherein a length of the leading end of each of the flexible strips, essentially equal to the length of the open space between the end members, is formed to permit air to pass through or past said leading end during the initial installation of said flexible strips across said open space between said end members.

13. A solar energy collector in accordance with claim 9 wherein the flexible strips are mounted on the frame by means of a rotatable supply roll on one end and a rotatable take-up roll on the opposite end.

14. A solar energy collector system in accordance with claim 13, which additionally includes, biasing means in contact with at least one end of each of the flexible strips, adapted to permit said flexible strips to move a limited distance against the biasing force of said biasing means when a force is applied to the surface of said flexible strips and to return to essentially their original position when said force is released.

15. A solar energy collector system in accordance with claim 13 which additionally includes at least one flexible support strip means separate from and mounted separately from the flexible strips of reflective material, mounted beneath said flexible strips of reflective material and having a strength normally sufficient to withstand significant pressure, whereby said flexible strips of reflective material are supported thereby.

16. A solar energy collector system in accordance with claim 13 wherein a length of the leading end of each of the flexible strips, essentially equal to the length of the open space between the end members, is formed to permit air to pass through or past said leading end during the initial installation of said flexible strips across said open space between said end members.

17. A solar energy collector system in accordance with claim 13 wherein at least the supply roll, of the supply roll and the takeup roll, is removably mounted on the frame to permit substitution of a fresh roll of flexible strip for an exhausted roll.

18. A solar energy collector system in accordance with claim 17 which additionally includes biasing means in contact with at least one end of each of the flexible strips, adapted to permit said flexible strips to move a limited distance against the biasing force of said biasing means when a force is applied to the surface of said flexible strip and to return to essentially their original position when said force is released.

19. A solar energy collector system in accordance with claim 17 which additionally includes at least one flexible support strip means separate from and mounted separately from the flexible strips of reflective material, mounted beneath said flexible strips of reflective material and having a strength normally sufficient to withstand significant pressure, whereby said flexible strips of reflective material are supported thereby.

20. A solar energy collector system in accordance with claim 17 wherein a length of the leading end of each of the flexible strips, essentially equal to the length of the open space between the end members, is formed to permit air to pass through or past said leading end during the initial installation of said flexible strip across said open space between said end members.

* * * * *